US009151616B1

(12) United States Patent
Henderson et al.

(10) Patent No.: US 9,151,616 B1
(45) Date of Patent: Oct. 6, 2015

(54) ROUTE EVENT MAPPING

(71) Applicants: Travis Ryan Henderson, Spokane, WA (US); David Anthony Morasch, Spokane, WA (US)

(72) Inventors: Travis Ryan Henderson, Spokane, WA (US); David Anthony Morasch, Spokane, WA (US)

( * ) Notice: Subject to any disclaimer, the term of this patent is extended or adjusted under 35 U.S.C. 154(b) by 0 days.

(21) Appl. No.: 14/030,979

(22) Filed: Sep. 18, 2013

Related U.S. Application Data

(60) Provisional application No. 61/705,675, filed on Sep. 26, 2012.

(51) Int. Cl.
*G01C 21/00* (2006.01)
*G01C 21/36* (2006.01)
*G01C 21/34* (2006.01)

(52) U.S. Cl.
CPC ...................................... *G01C 21/00* (2013.01)

(58) Field of Classification Search
None
See application file for complete search history.

(56) References Cited

U.S. PATENT DOCUMENTS

| | | | |
|---|---|---|---|
| 7,254,516 B2 * | 8/2007 | Case et al. .................... | 702/182 |
| 7,901,292 B1 * | 3/2011 | Uhlir et al. ...................... | 463/42 |
| 7,934,983 B1 * | 5/2011 | Eisner ................................ | 463/6 |
| 8,121,785 B2 * | 2/2012 | Swisher et al. ................ | 701/423 |
| 8,562,489 B2 * | 10/2013 | Burton et al. ...................... | 482/9 |
| 8,768,613 B2 * | 7/2014 | Bamba ........................... | 701/410 |
| 2006/0136173 A1 * | 6/2006 | Case et al. ...................... | 702/182 |
| 2009/0047645 A1 * | 2/2009 | Dibenedetto et al. .......... | 434/258 |
| 2009/0063049 A1 * | 3/2009 | Swisher et al. ................ | 701/213 |
| 2009/0269728 A1 * | 10/2009 | Verstegen et al. .............. | 434/247 |
| 2011/0003665 A1 * | 1/2011 | Burton et al. ...................... | 482/9 |
| 2012/0047102 A1 * | 2/2012 | Petersen et al. .................. | 706/52 |
| 2012/0136566 A1 * | 5/2012 | Bamba ........................... | 701/410 |
| 2014/0067264 A1 * | 3/2014 | Houjou ........................... | 701/527 |
| 2014/0228988 A1 * | 8/2014 | Hoffman et al. ................ | 700/91 |

* cited by examiner

*Primary Examiner* — Yonel Beaulieu
*Assistant Examiner* — Krishnan Ramesh

(57) ABSTRACT

In embodiments of route event mapping, a device has a display device that displays a map of a region, which includes a location of the device. A route event mapping service can receive an input of an athletic event course as a user input to the device, and obtain course data of the athletic event course, such as a course route, a course length, environmental conditions, and/or elevation data. The route event mapping service can then determine a training course within the region that includes the location of the device based on the course data. The route event mapping service can also map training segments of the training course that approximate segments of the athletic event course, where the training segments are mapped within the region that includes the location of the device. The mapped training segments can then be displayed in the map of the region.

20 Claims, 7 Drawing Sheets

ROUTE EVENT MAPPING

RELATED APPLICATION

This application claims priority to U.S. Provisional Application Ser. No. 61/705,675 filed Sep. 26, 2012 entitled "Route Event Mapping" to Henderson et al., the disclosure of which is incorporated by reference herein in its entirety.

BACKGROUND

Competitive and even casual runners may train for several months or years for running and/or biking events, such as the marathons in Boston and Chicago, as well as the many triathlons and bike racing events throughout the United States and the World. Many runners and bicyclists that participate in these events travel hundreds and sometimes thousands of miles to participate. Many participants train specifically for a running and/or biking event that they have entered, however, most participants are not able to travel and train on the actual course for the running and/or biking event. For example, if a runner residing in Spokane Wash. was to enter the marathon in San Francisco Calif., he or she could expect to encounter significant and frequent elevation gains and losses during the event. However, the runner would have a difficult time emulating the San Francisco marathon route for training purposes in Spokane because the topography in Spokane differs from San Francisco, particularly over the twenty-six mile marathon route.

BRIEF DESCRIPTION OF THE DRAWINGS

Embodiments of route event mapping are described with reference to the following Figures. The same numbers may be used throughout to reference like features and components that are shown in the Figures.

DETAILED DESCRIPTION

Embodiments of route event mapping can be implemented by a route event mapping service, as described herein. A route event mapping service can be implemented by any type of user device, or as a network-based service that provides route event mapping when initiated as a request from a user device. A route event mapping service can receive an input of an athletic event course, such as for any type of running, biking, walking, racing, and/or similar event. Based on course data of the athletic event course, such as a course length, elevation data, a course route, environment information, and/or any other course-related information, the route event mapping service can determine a training course, and map training segments of the training course within a region that includes a current location of a user device.

For example, a runner in Spokane Wash. may want to train for the marathon in San Francisco Calif., but is not able to run the actual course. The runner can enter or select the marathon for San Francisco (e.g., as an athletic event course), and the route event mapping service determines a training course in the Spokane region, where the runner is located with his or her device. Additionally, training segments of the training course that approximate (e.g., are similar or identical) to segments of the athletic event course can be mapped to a map of the Spokane region. The runner is then provided with a realistic training course and is able to run outdoors on a route that most closely matches the route of the athletic event course the runner wants to train for and run. Similarly, the same runner may travel on business or vacation to any other destination, and initiate the route event mapping service to provide a training course for the marathon from wherever the runner is currently located or staying.

While features and concepts of route event mapping can be implemented in any number of different devices, systems, networks, environments, and/or configurations, embodiments of route event mapping are described in the context of the following example devices, systems, and methods.

Figure 1:
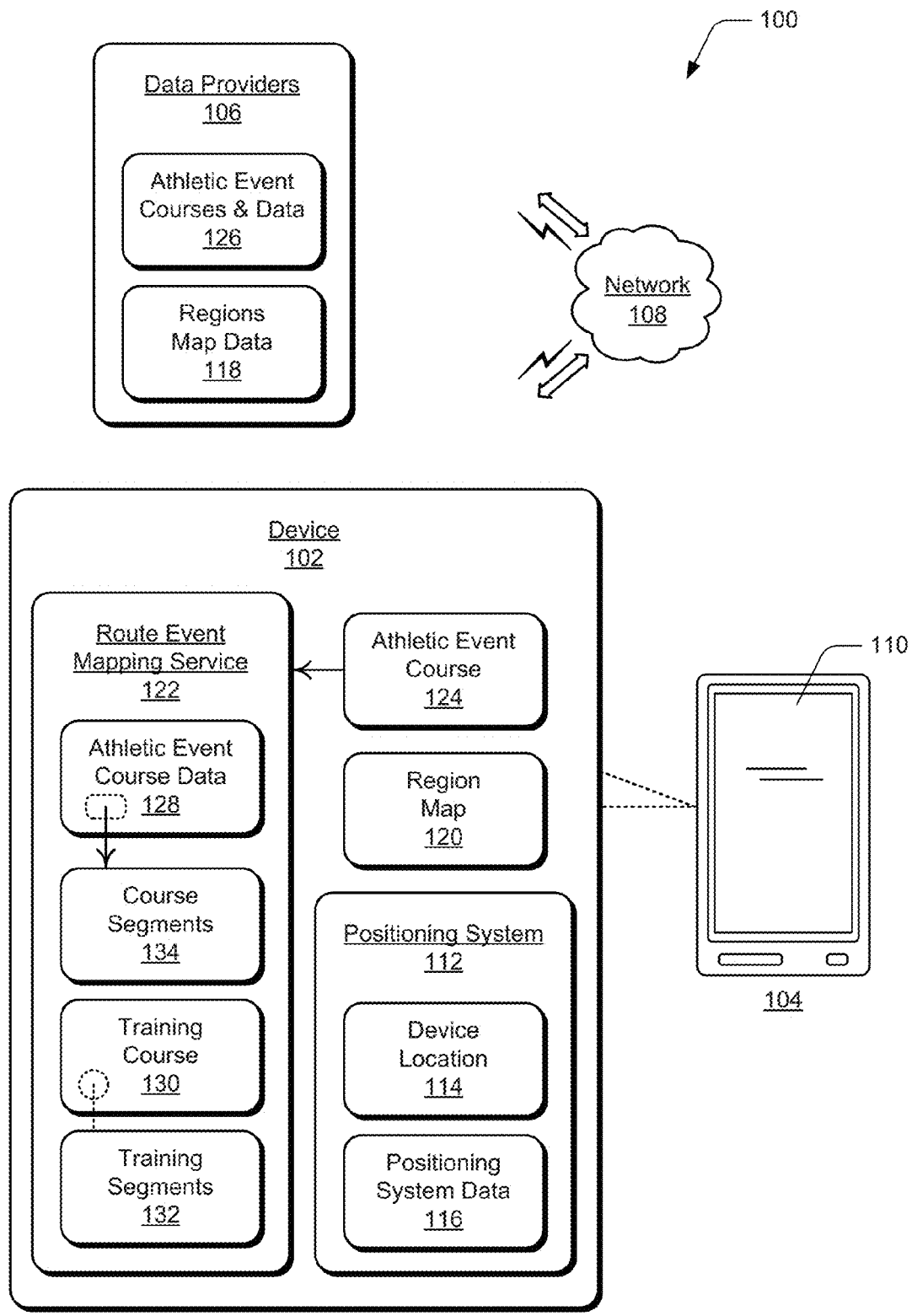
FIG. 1 illustrates a system that includes an example device in which embodiments of route event mapping can be implemented.

FIG. 1 illustrates an example system 100 that includes a device 102 in which embodiments of route event mapping can be implemented. The example device 102 may be any type of a wired and/or wireless device, such as any one or combination of a mobile phone 104, tablet device, computing device, communication, entertainment, gaming, navigation, and/or other type of electronic, wearable, and/or portable device. Any of the devices described herein can be implemented with various components, such as a memory and/or processing system (e.g., computer processor, SoC, programmed ASIC, logic system, etc.) as well as any number and combination of differing components as further described with reference to the example device shown in FIG. 7 to implement embodiments of route event mapping.

The example system 100 may also include data providers 106, such as any type of server system, network service, network site, content source, and/or data source from which any type of data and information may be requested and/or obtained. Any of the devices, services, and providers described herein can communicate via a network 108, which can be implemented to include wired and/or wireless networks. The network can also be implemented using any type of network topology and/or communication protocol, and can be represented or otherwise implemented as a combination of two or more networks, to include IP-based networks and/or the Internet. The network may also include mobile operator networks that are managed by mobile operators, such as a communication service provider, cell-phone provider, and/or Internet service provider. A mobile operator can facilitate mobile data and/or voice communication for any type of a wireless device or mobile phone.

In this example, the device 102 includes a display device 110 (e.g., an integrated display device) on which any type of a map or user interface can be displayed, such as a user interface of the route event mapping service. The device 102 also includes a positioning system 112 that is implemented to determine a current device location 114 based on positioning system data 116. The positioning system data (e.g., location data, also referred to as geographic location data) can be obtained as Global Positioning System (GPS) data and/or as other regional position data. The GPS location data of a device can indicate the latitude, longitude, and altitude of the device, typically within a couple of meters. Alternatively or in addition to GPS location data, regional position data can indicate the current location of the device based on communications via cellular towers or other network communication equipment that has a known location relative to an approximate location of the device.

The device 102 can receive regions map data 118 from a data provider 106, and the display device 110 can display a region map 120 of a region that includes the location 114 of the device, such as based on the positioning system data 116. A region that includes the location of the device can be any designated region, such as within an area, an environment, a particular terrain, a city, county, state, or any other region defined by a designated boundary or characteristic.

In embodiments, the device 102 includes a route event mapping service 122, which may be implemented as a software application. The device 102 can include services, such as executable software instructions (e.g., computer-executable instructions), that can be executed by a processing system to implement embodiments of route event mapping. As a software application, the route event mapping service 122 can be stored on computer-readable storage memory, such as any suitable memory device or electronic data storage implemented in the device 102. The route event mapping service 122 can receive an input of an athletic event course 124, such as a user input to the device by a user of the device. For example, a user may initiate an input of the Maui Marathon in Hawaii, or initiate an input of the Tour de France bike race event (e.g., as athletic event courses). In implementations, a user may select an athletic event course from a list of athletic event course selections, or initiate an input of any athletic event course for any type of running, biking, walking, racing, and/or similar event. The device 102 may then request and/or obtain athletic event courses and data 126 from a data provider 106 (e.g., any type of server system, network service, network site, content source, and/or data source from which any type of data and information may be requested and/or obtained). Alternatively or in addition, the route event mapping service 122 at the device 102 may include a database of the athletic event courses and data.

In embodiments, the route event mapping service 122 is implemented to receive the input of the athletic event course 124 and obtain course data 128 of the athletic event course. As indicated, the athletic event course data 128 may be maintained locally at the device 102, or may be obtained from a data provider 106. The course data 128, as well as the athletic event courses and data 126, can include a course length, elevation data, a course route, environmental information, and/or any other course-related information. Based on the course data of the athletic event course, the route event mapping service 122 can determine and/or generate a training course 130 within the region that includes the location 114 of the device. A training course in the region that includes the current location of the device may be similar, identical, approximate, and/or a partial representation of the athletic event course. The route event mapping service can also map training segments 132 of the training course that at least approximate course segments 134 of the athletic event course, and the similar or identical training segments are mapped within the region that includes the location of the device. The route event mapping service can then initiate a display of the mapped training segments in a map of the region on the display device 110 for a user of the device.

In an example, a runner in Spokane Wash. may want to train for the Maui Marathon, but is not able to travel and train on the actual course in Hawaii. The runner can enter the Maui Marathon (e.g., the athletic event course 124) as a user input to the device 102, and the route event mapping service 122 receives the athletic event course input. Based on the course data 128 that corresponds to the Maui Marathon, such as the course length, elevation data, course route, environmental information, and/or any other course-related information, the route event mapping service determines a training course in and/or around the Spokane region, where the runner is located with the device. The training course in the Spokane region may be similar, identical, approximate, and/or a partial representation of the Maui Marathon course. The Spokane region may include any area in and/or around Spokane, to include the city, county, surrounding area, the entire state of Washington, and/or neighboring areas (e.g., cities, states, etc.).

In this example, the training course 130 that is determined by the route event mapping service 122 may be generated based on course segments 134 of the Maui Marathon and the elevation gains and losses corresponding to each course segment of the marathon. The route event mapping service can correlate the training segments 132 of the training course 130 to the course segments 134 of the marathon, such as based on the distance of course segments and/or the elevation data for each course segment. A course segment may be based on distance (e.g., each mile of an athletic event), based on the distance from one particular landmark to another, based on elevation (e.g., a half-mile hill climb), and/or based on any other designated course segment characteristic.

The training segments 132 of the training course 130 at least approximate the course segments 134 of the athletic event course 124 based on one or more of the course data types and information. Further, any combination of one or more training segments 132 can be used to represent a course segment 134, such as one training segment that may represent both the third and ninth miles of a particular athletic event course. The route event mapping service can then map the training segments of the training course within the Spokane region, and the map of the region can be displayed on the device for the user (e.g., the runner using the device). The runner is then provided with a realistic training course and is able to run outdoors on a route that most closely matches the route of the athletic event course the runner wants to train for and run in the future.

In embodiments, alternate and/or additional features of route event mapping can be implemented. For example, a user of the device 102 may enter a distance limit from the current device location 114 along with the input of the athletic event course 124. The route event mapping service 122 can then determine the training segments 132 of the training course 130 within the region that includes the current location of the device and within the distance limit from the current location of the device. For example, the runner in Spokane may not want to travel more than ten miles to a starting point of the training course, and can enter a distance limit of ten miles. The route event mapping service can then determine the start of the training course (or all, or some of the training course) within the ten mile limit. Without a distance limit, the route event mapping service can be implemented to determine a training course any distance from the current location of the device, up to and including the actual athletic event course itself.

In another example, the route event mapping service 122 can be implemented to determine and/or generate individual ones of the training segments 132 of the training course 130. Further, any two or more of the training segments need not be consecutive when the training course is mapped within the region that includes the location of the device. Accordingly, the training course 130 may be representative of the same distance and similar (e.g., the same or approximate) to the athletic event course 124. Alternatively, the training course 130 may be representative of one training segment, or several training segments, mapped in consecutive or non-consecutive order.

A user of the device 102 may enter a segment designation along with the input of the athletic event course 124. For example, the runner in Spokane may want to specifically train for the two miles between mile markers eight and ten of the Maui Marathon, which are a considerable up-hill challenge, and enter a segment designation of the two miles. The route event mapping service can then determine a training segment (or two or more training segments) within the Spokane region that approximate the two miles between mile markers eight and ten of the marathon. Alternatively or in addition, the user of the device may enter a training elevation gain and/or loss, and the route event mapping service can then determine a training segment (or two or more training segments) within the Spokane region that approximate the elevation gain and/or loss.

In another example, a user may want to begin the training course and/or a training segment of the training course directly from his or her current location (e.g., the current location 114 of the device 102). For example, the route event mapping service 122 at the device 102 can receive an input of the athletic event course 124 as a user input to the device, obtain the athletic event course data 128, and determine one or more training segments of the training course that at least approximates respective course segments 134 of the athletic event course based on the course data. The route event mapping service can then provide a direction to begin a training segment from the current device location. The direction to begin the training segment can include mapping the one or more training segments on a map that includes the location of the device, and is displayed on the display device 110. Alternatively or in addition, the direction to begin the training segment can be route instructions that are displayed to direct the user along the training segment and/or audio instructions that are rendered with an audio system of the device to direct the user along the training segment. For example, a runner may carry a mobile phone, which can include an application to track running distances, routes, and training progress. The device 102 can be implemented to display route instructions and/or render audio instructions from the start of a training segment as the user runs along the training segment.

In embodiments, the route event mapping service 122 can be implemented to determine multiple, different training segments 132 that correlate to the same course segment 134 of the athletic event course 124. The different training segments that correlate to the same athletic event course segment can be displayed on the map of the region that includes the current device location, and the user can then choose any of the different training segments on which to train. In implementations, this feature may be implemented for any number of different training segments that correlate to a course segment of the athletic event course. Additionally, the route event mapping service can be implemented to indicate, such as on the display device 110 of the device, any of the course segments 134 that could not be determined as a training segment 132 in the region of the current device location. For example, the route event mapping service may not determine the one or more training segments that approximate the two miles between mile markers eight and ten of the Maui Marathon, which are a considerable up-hill challenge, particularly within a distance limit of the user if the user is currently located in a relatively flat region.

In other embodiments, the route event mapping service 122 can be implemented to generate an overlay of the training course 130 that is displayed over a representation of the athletic event course 124, or vice-versa. Additionally, the overlay can display the correlation of the training segments 132 to the course segments 134 on the display device 110. For example, the training course determined for the runner in the Spokane region can be displayed over the Maui Marathon course to display the correlation of the Spokane region map to the marathon course. Alternatively, the Maui Marathon course can be displayed over the Spokane region to display the correlation of the marathon course to the map of the Spokane region.

Figure 2:
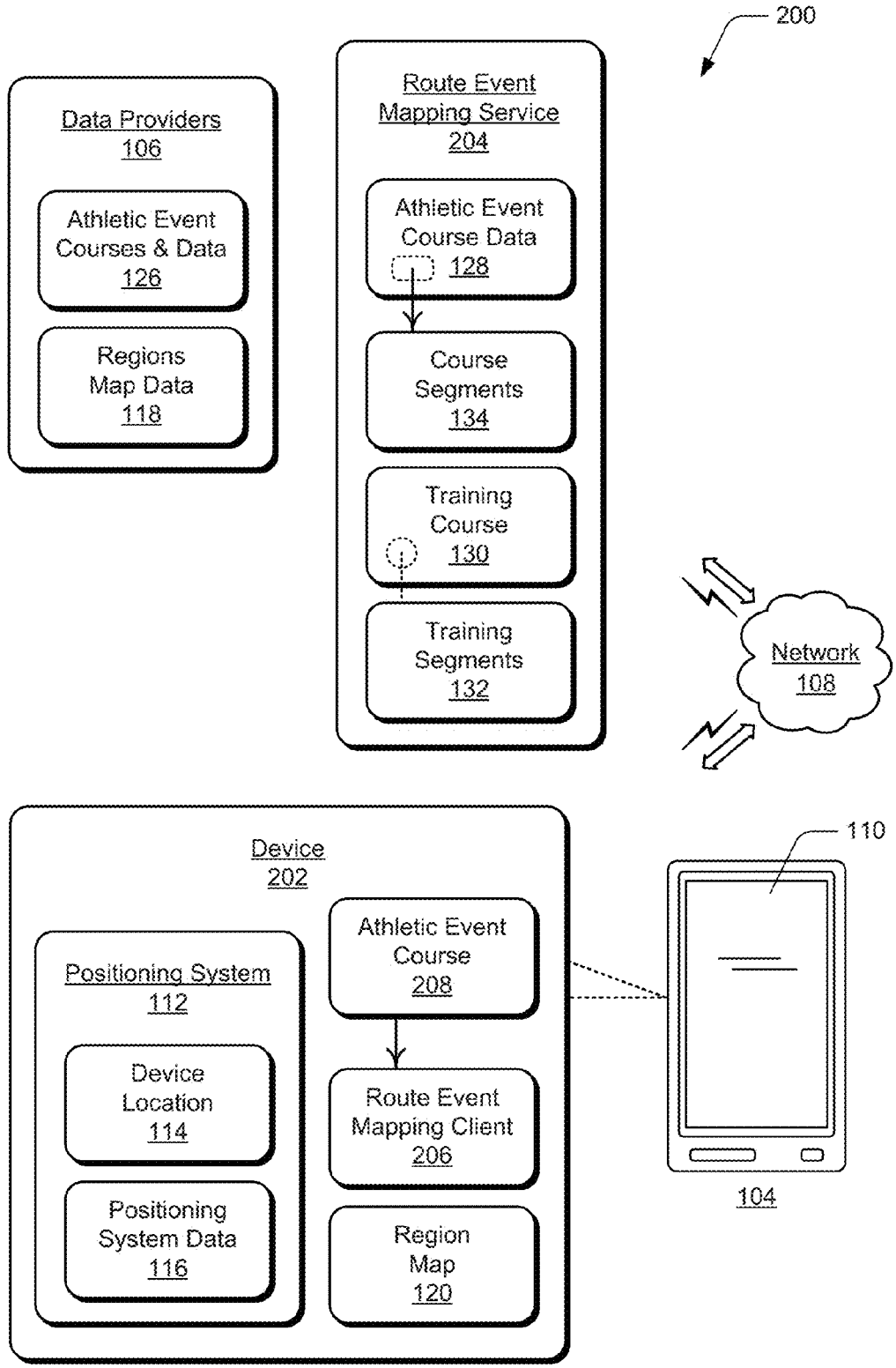
FIG. 2 illustrates an example system in which embodiments of route event mapping can be implemented.

FIG. 2 illustrates an example system 200 in which embodiments of route event mapping can be implemented. The example system 200 includes a device 202 that has the positioning system 112, and is similar in implementation to the device 102 described with reference to FIG. 1. The device 202 may be any type of device described with reference to FIG. 1, such as the mobile phone 104 with the display device 110. The example system 200 also includes the data providers 106 and the network 108 as described with reference to FIG. 1. In this example, the system includes a network-based (e.g., cloud-based) route event mapping service 204, which can implement any of the embodiments, features, and aspects of route event mapping described herein.

The device 202 can include a route event mapping client 206, which is implemented to interface with the route event mapping service 204 via the network 108 to implement embodiments of route event mapping. The route event mapping client 206 can be implemented as a software application, such as executable software instructions (e.g., computer-executable instructions) that are executable by a processing system of the device and stored on a computer-readable storage memory of the device. The route event mapping client 206 can receive an input of an athletic event course 208, such as a user input to the device by a user of the device. The athletic event course 208 and the device location 114 can then be communicated to the route event mapping service 204 that receives the input of the athletic event course and the device location, and obtains the course data 128 of the athletic event course.

Based on the course data 128 of the athletic event course 208, the route event mapping service 204 can determine and/or generate the training course 130 within a region that includes the location 114 of the device 202. The route event mapping service 204 can also map the training segments 132 of the training course that at least approximate the course segments 134 of the athletic event course, and the similar or identical training segments are mapped within the region that includes the location of the device, as described above with reference to FIG. 1. The route event mapping service can then communicate the training course 130 and/or the training segments 132 to the device 202 for display in a map of the region that includes the location of the device.

Figure 3:
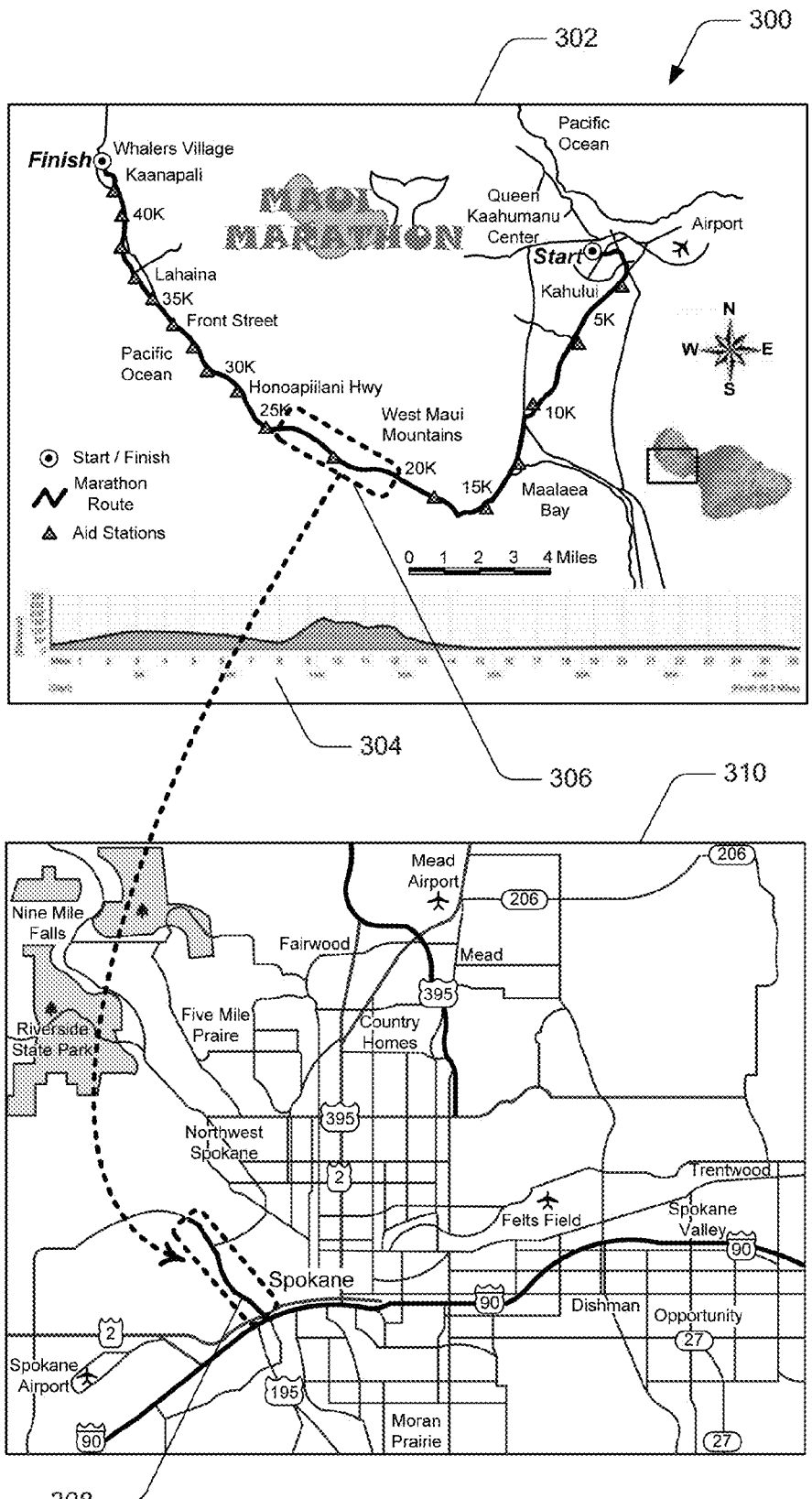
FIG. 3 illustrates an example of route event mapping in accordance with one or more embodiments.

FIG. 3 illustrates an example 300 of an athletic event course 302 that includes course data 304 (e.g., elevation and distance data). The route event mapping service 122 (FIG. 1) and/or the route event mapping service 204 (FIG. 2) can correlate course segments, such as an approximate two-mile segment 306, of the athletic event course 302 with one or more training segments 308 on a region map 310 that includes a location of a device, such as described with reference to FIGS. 1 and 2. For example, the runner in Spokane Wash. (i.e., region map 310) wants to train for the Maui Marathon (i.e., athletic event course 302), and the route event mapping service correlates the approximate two-mile segment 306 of the Maui Marathon course with the one or more training segments 308 in the Spokane region. The training segments 308 in the Spokane region may be similar, identical, approximate, and/or a partial representation of the Maui Marathon two-mile segment.

Figure 4:
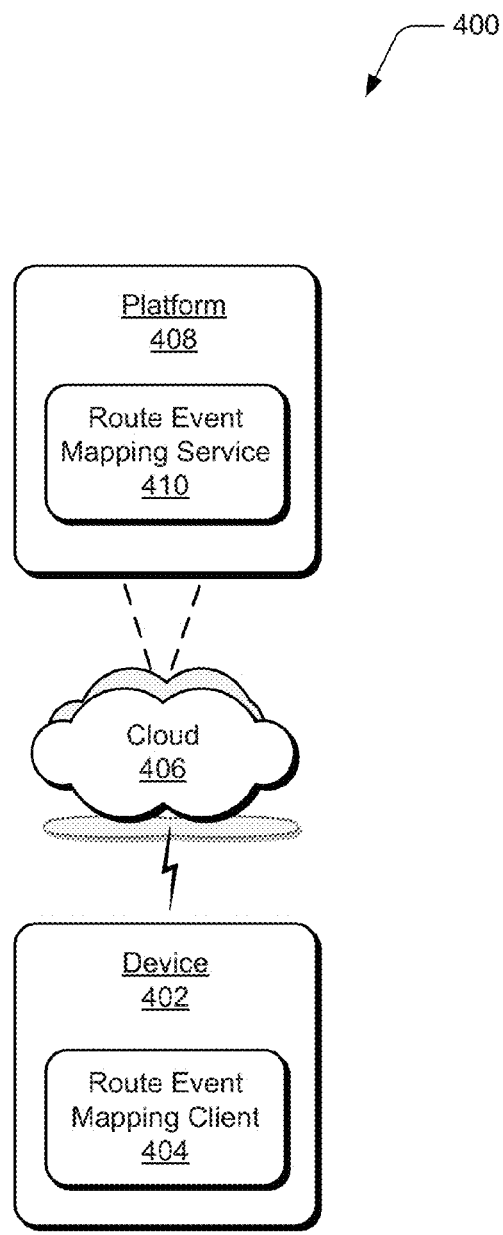
FIG. 4 illustrates an example system in which embodiments of route event mapping can be implemented.

FIG. 4 illustrates an example system 400 that includes a device 402, such as either of the devices 102 or 202 described with reference to respective FIGS. 1 and 2. The device 402 includes a route event mapping client 404, such as the route event mapping client 206 described with reference to FIG. 2. In the example system 400, multiple devices can be interconnected through a central computing device or system, which may be local to the multiple devices or may be located remotely from the multiple devices. In embodiments, a central computing device may be a cloud 406 of one or more server computers that are connected to the multiple devices through a network, the Internet, or other data communication link. In embodiments, this interconnection architecture enables functionality across multiple devices to provide a networked service environment.

The central computing device can utilize a platform 408 to implement a route event mapping service 410, such as the network-based route event mapping service 204 described with reference to FIG. 2. The cloud 406 includes and/or is representative of the platform 408 for networked service components (i.e., the route event mapping service) that implement embodiments of route event mapping. The platform abstracts underlying functionality of hardware, such as server devices, and/or software resources of the cloud. The networked service components may include applications and/or data that can be utilized while computer processing is executed on servers that are remote from the device 402.

Example methods 500 and 600 are described with reference to respective FIGS. 5 and 6 in accordance with one or more embodiments of route event mapping. Generally, any of the services, components, modules, methods, and operations described herein can be implemented using software, firmware, hardware (e.g., fixed logic circuitry), manual processing, or any combination thereof. The example methods may be described in the general context of executable instructions stored on a computer-readable storage memory that is local and/or remote to a computer processing system, and implementations can include software applications, programs, functions, and the like.

Figure 5:
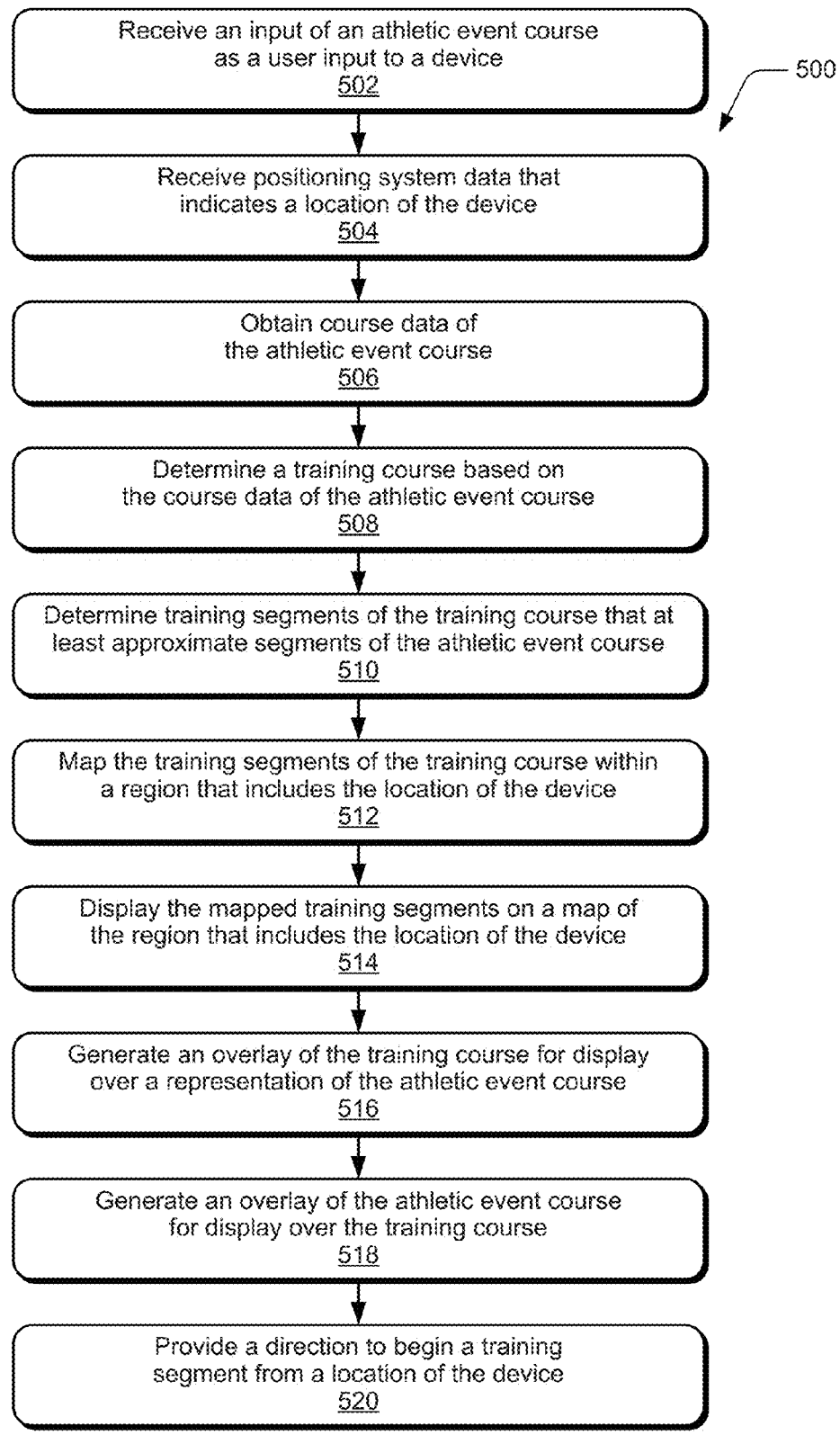
FIG. 5 illustrates example method(s) of route event mapping in accordance with one or more embodiments.

FIG. 5 illustrates example method(s) 500 of route event mapping, and is generally described with reference to a user device that implements a route event mapping service. The order in which the method is described is not intended to be construed as a limitation, and any number or combination of the method operations can be combined in any order to implement a method, or an alternate method.

At 502, an input of an athletic event course is received as a user input to a device. For example, the route event mapping service 122 implemented by the device 102 (FIG. 1) receives an input of an the athletic event course 124 as a user input to the device. For example, a user may initiate an input of the Maui Marathon in Hawaii, or initiate an input of the Tour de France bike race event (e.g., as athletic event courses). In implementations, a user may select an athletic event course from a list of athletic event course selections, or initiate an input of any athletic event course for any type of running, biking, walking, racing, and/or similar event.

At 504, positioning system data that indicates a location of the device is received. For example, the route event mapping service 122 receives positioning system data 116 from the positioning system 112, and the positioning system data indicates a location of the device. The positioning system data can be GPS data and/or other regional position data that indicates the latitude, longitude, and altitude of the device 102, typically within a couple of meters. Alternatively or in addition to the GPS location data, regional position data can indicate the current location of the device based on communications via cellular towers or other network communication equipment that has a known location relative to an approximate location of the device.

At 506, course data of the athletic event course is obtained. For example, the route event mapping service 122 obtains the course data 126 of the athletic event course from the data providers 106 and/or from a database of athletic event course data 128 that is maintained on the device 102. The athletic event course data can include a course length, elevation data, a course route, environmental information, and/or any other course-related information.

At 508, a training course based on the course data of the athletic event course is determined and, at 510, training segments of the training course are determined that at least approximate segments of the athletic event course. For example, the route event mapping service 122 determines the training course 130 based on the course data 128 of the athletic event course 124, and the training course is determined within the region that includes the location 114 of the device 102. The route event mapping service 122 determines the training segments 132 of the training course 130, and the training segments at least approximate the course segments 134 of the athletic event course. The training course and training segments in the region that includes the current location of the device may be similar, identical, approximate, and/or a partial representation of the athletic event course.

At 512, the training segments of the training course are mapped within a region that includes the location of the device and, at 514, the mapped training segments are displayed on a map of the region. For example, the route event mapping service 122 maps the training segments 132 of the training course 130 within a region that includes the location of the device 102, and the route event mapping service initiates a display of the mapped training segments in a map of the region on the display device 110 for a user of the device.

At 516, an overlay of the training course is generated for display over a representation of the athletic event course. Alternatively or in addition at 518, an overlay of the athletic event course is generated for display over the training course. For example, the route event mapping service 122 generates an overlay of the training course 130 that is displayed over a representation of the athletic event course 124, or vice-versa. Additionally, the overlay can display the correlation of the training segments 132 to the course segments 134 on the display device 110 for a user of the device.

At 520, a direction is provided to begin a training segment from a location of the device. For example, the route event mapping service 122 provides a direction to begin a training segment from a location of the device. The direction to begin the training segment can include mapping the training segments 132 on a map that includes the location of the device 102, and the map is displayed on the display device 110. Alternatively or in addition, the direction to begin the training segment can be route instructions that are displayed to direct the user along the training segment and/or audio instructions that are rendered with an audio system of the device to direct the user along the training segment. The route instructions can be displayed and/or the audio instructions rendered from the start of a training segment as the user runs along the training segment.

Figure 6:
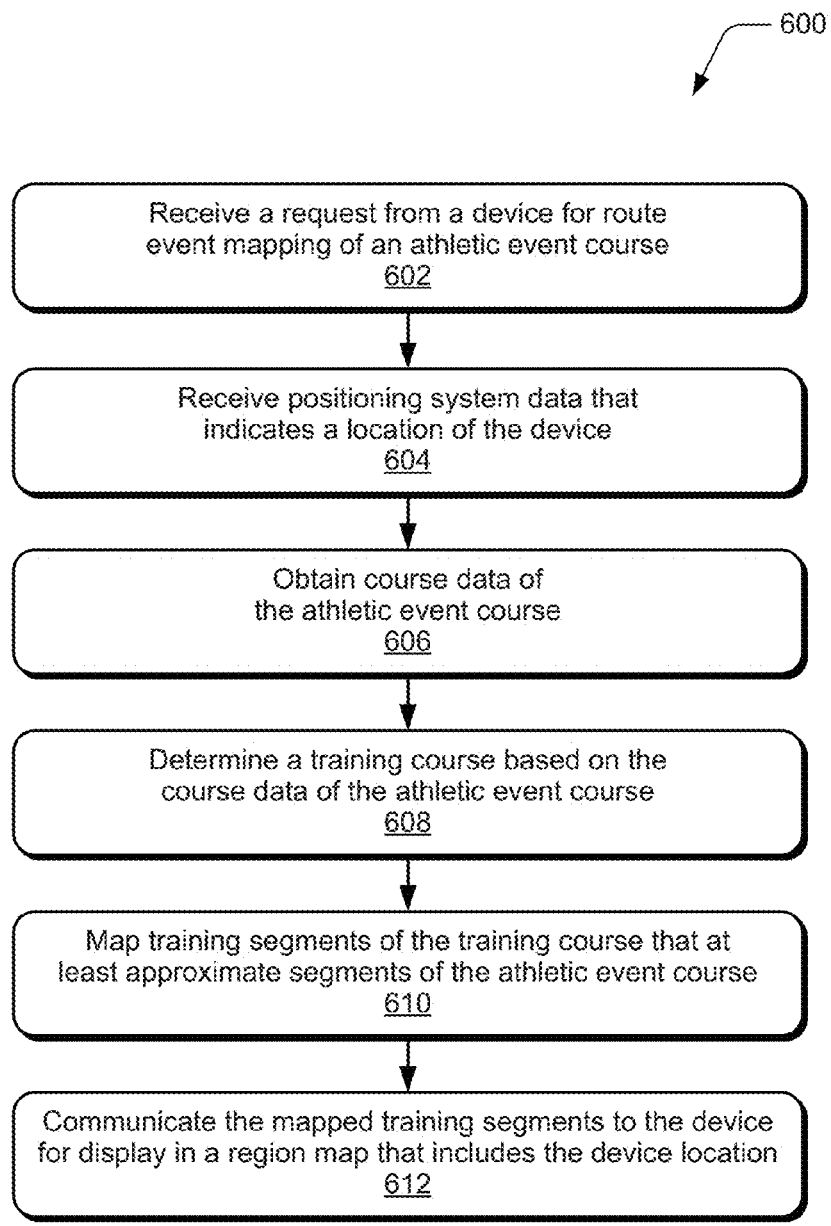
FIG. 6 illustrates example method(s) of route event mapping in accordance with one or more embodiments.

FIG. 6 illustrates example method(s) 600 of route event mapping, and is generally described with reference to a network-based (e.g., cloud-based) service that implements a route event mapping service. The order in which the method is described is not intended to be construed as a limitation, and any number or combination of the method operations can be combined in any order to implement a method, or an alternate method.

At 602, a request is received from a device for route event mapping of an athletic event course. For example, the network-based (e.g., cloud-based) route event mapping service 204 (FIG. 2) receives a request from the device 202 for route event mapping of an athletic event course. The route event mapping client 206 implemented by the device 202 receives an input of an athletic event course 208, such as a user input to the device by a user of the device. The athletic event course 208 can then be communicated to the route event mapping service 204.

At 604, positioning system data is received that indicates a location of the device and, at 606, course data of the athletic event course is obtained. For example, the route event mapping service 204 receives the device location as the positioning system data 116 that indicates a location of the device 202, and the route event mapping service obtains the course data 128 of the athletic event course. In implementations, the athletic event courses and data 126, as well as the regions map data 118, may be obtained from the data providers 106.

At 608, a training course is determined based on the course data of the athletic event course and, at 610, training segments of the training course are mapped that at least approximate segments of the athletic event course. For example, the route event mapping service 204 determines the training course 130 based on the course data and maps the training segments 132 of the training course that at least approximate segments of the athletic event course.

At 612, the mapped training segments are communicated to the device for display in a region map that includes the device location. For example, the route event mapping service 204 communicates the mapped training segments 132 back to the device 202 for display in a region map that includes the device location. Additionally, the route event mapping service 204 can be implemented to generate and/or determine any of the other features of route event mapping as described with reference to FIGS. 1, 2, and 5.

Figure 7:
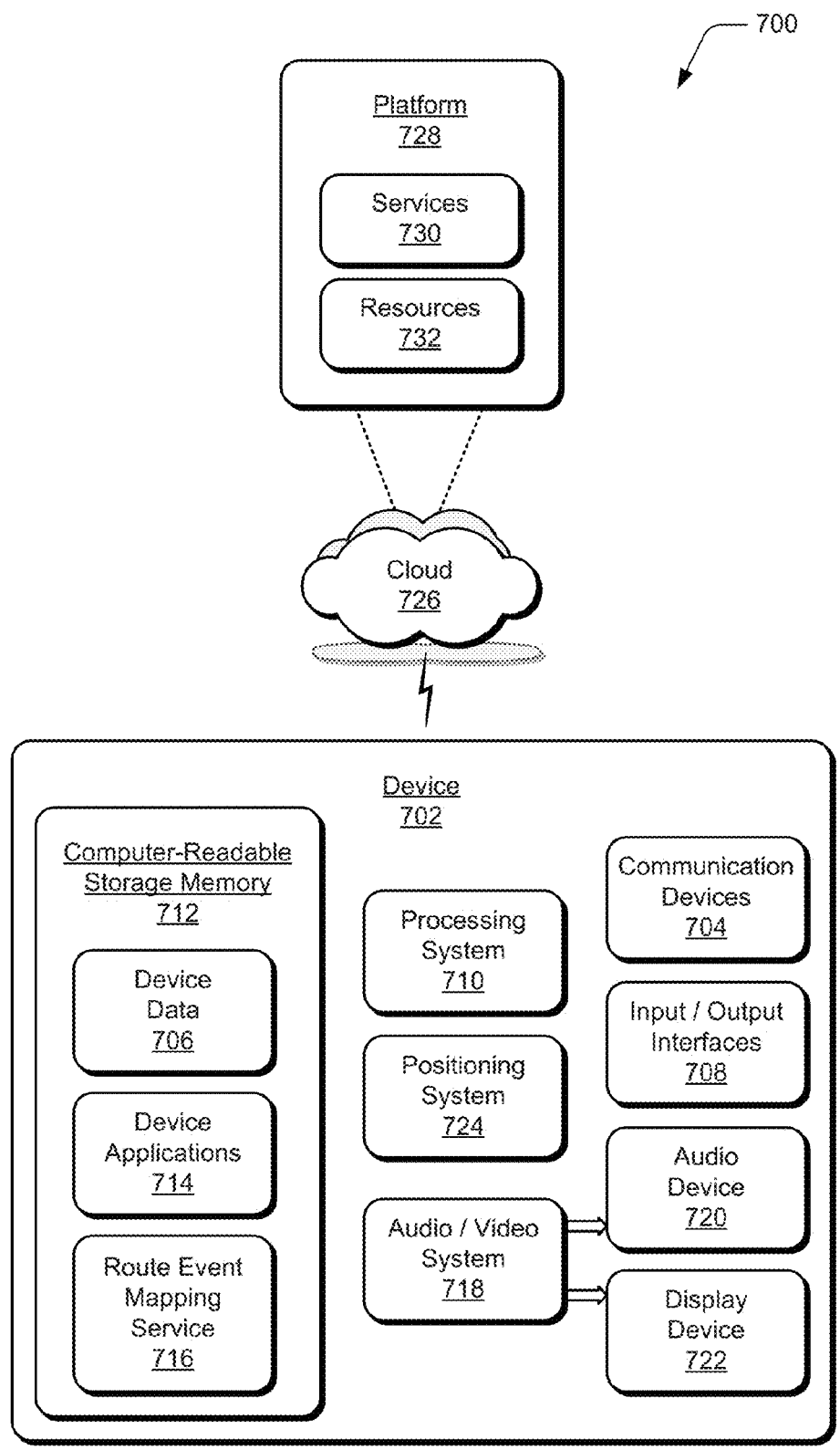
FIG. 7 illustrates an example system with an example device that can implement embodiments of route event mapping.

FIG. 7 illustrates an example system 700 that includes an example device 702, which can implement embodiments of route event mapping. The example device 702 can be implemented as any of the devices and/or services (e.g., server devices) described with reference to the previous FIGS. 1-6, such as any type of client device, mobile phone, tablet, computing, communication, entertainment, gaming, media playback, navigation, and/or other type of electronic, wearable, and/or portable device. The device may also be associated with a user (i.e., a person) and/or an entity that operates the device such that a device describes logical devices that include users, software, firmware, hardware, and/or a combination of devices.

The device 702 includes communication devices 704 that enable wired and/or wireless communication of device data 706, such as the positioning system data, device location, athletic event course data, and training course data. The device data can include any type of audio, video, and/or image data, as well as any type of athletic event data. The communication devices 704 can also include transceivers for cellular phone communication and/or for network data communication.

The device 702 also includes input/output (I/O) interfaces 708, such as data network interfaces that provide connection and/or communication links between the device, data networks, and other devices. The I/O interfaces can be used to couple the device to any type of components, peripherals, and/or accessory devices, such as a digital camera device that may be integrated with device 702. The I/O interfaces also include data input ports via which any type of data, media content, and/or inputs can be received, such as user inputs to the device, as well as any type of audio, video, and/or image data received from any content and/or data source.

The device 702 includes a processing system 710 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 702 may further include any type of a system bus or other data and command transfer system that couples the various components within the device. A system bus can include any one or combination of different bus structures and architectures, as well as control and data lines.

The device 702 also includes computer-readable storage memory 712, such as data storage devices that can be accessed by a computing device, and that provide persistent storage of data and executable instructions (e.g., software applications, programs, functions, and the like). Examples of computer-readable storage memory include volatile memory and non-volatile memory, fixed and removable memory devices, and any suitable memory device or electronic data storage that maintains data for computing device access. The computer-readable storage memory can include various implementations of random access memory (RAM), read-only memory (ROM), flash memory, and other types of storage media in various memory device configurations.

The computer-readable storage memory 712 provides storage of the device data 706 and various device applications 714, such as an operating system that is maintained as a software application with the computer-readable storage memory and executed by the processing system 710. In this example, the device applications also include a route event mapping service 716 that implements embodiments of route event mapping. Examples of the route event mapping service 716 include the route event mapping service 102 implemented by the device 102 as described with reference to FIG. 1, and the route event mapping service 204 implemented as a cloud-based service as described with reference to FIG. 2.

The device 702 also includes an audio and/or video system 718 that generates audio data for an audio device 720 and/or generates display data for a display device 722. The audio device and/or the display device include any devices that process, display, and/or otherwise render audio, video, display, and/or image data, such as a region map showing a training course and/or training segments of the training course. In implementations, the audio device and/or the display device are integrated components of the example device 702. Alternatively, the audio device and/or the display device are external, peripheral components to the example device. The device 702 also includes a positioning system 724 that determines and/or tracks device location based on positioning system data, such as geographic location data, Global Positioning System (GPS) data, and/or other regional position data based on communications via cellular towers or other network communication equipment.

In embodiments, at least part of the techniques described for route event mapping may be implemented in a distributed system, such as over a "cloud" 726 in a platform 728. The cloud 726 includes and/or is representative of the platform 728 for services 730 and/or resources 732. For example, the services 730 may include the route event mapping service 204 described with reference to FIG. 2. Additionally, the resources 732 may include the data providers 106 with the athletic event courses and data, as well as the regions map data, as described with reference to FIGS. 1 and 2.

The platform 728 abstracts underlying functionality of hardware, such as server devices (e.g., included in the services 730) and/or software resources (e.g., included as the resources 732), and connects the example device 702 with other devices, servers, etc. The resources 732 may also include applications and/or data that can be utilized while computer processing is executed on servers that are remote from the example device 702. Additionally, the services 730 and/or the resources 732 may facilitate subscriber network services, such as over the Internet, a cellular network, or Wi-Fi network. The platform 728 may also serve to abstract and scale resources to service a demand for the resources 732 that are implemented via the platform, such as in an interconnected device embodiment with functionality distributed throughout the system 700. For example, the functionality may be implemented in part at the example device 702 as well as via the platform 728 that abstracts the functionality of the cloud 726.

Although embodiments of route event mapping have been described in language specific to features and/or methods, the appended claims are not necessarily limited to the specific features or methods described. Rather, the specific features and methods are disclosed as example implementations of route event mapping.

The invention claimed is:

1. A device, comprising:
   a display device configured to display a map of a region that includes a location of the device;
   a processing system to implement a route event mapping service that is configured to:
   obtain course data of an athletic event course;
   determine a training course within the region based on the course data;
   map training segments of the training course that at least approximate segments of the athletic event course, the training segments mapped within the region that includes the location of the device;
   generate an overlay of the training course for display of the training segments over a representation of the athletic event course; and
   initiate a display of the mapped training segments in the map of the region on the display device.

2. The device as recited in claim 1, wherein the display device is configured to display the mapped training segments in the map of the region.

3. The device as recited in claim 1, wherein:
   the route event mapping service is configured to receive an input of the athletic event course as a user input to the device by a user of the device; and
   the course data of the athletic event course comprises at least one of a course route, a course length, and elevation data.

4. The device as recited in claim 1, wherein the route event mapping service is configured to determine the training segments of the training course, and wherein two or more of the training segments that correlate to respective segments of the athletic event course are mapped non-consecutive for display in the overlay of the training course over the representation of the athletic event course.

5. The device as recited in claim 1, wherein the route event mapping service is configured to:
   receive a distance limit as a user input; and
   determine a training segment of the training course that begins within the distance limit from the location of the device, the training segment extending beyond the distance limit.

6. The device as recited in claim 1, wherein the route event mapping service is configured to:
   receive a segment designation of a segment of the athletic event course as a user input; and
   determine a training segment within the region that most closely approximates the segment of the athletic event course.

7. The device as recited in claim 1, wherein the route event mapping service is configured to:
   receive an elevation input as a user input; and
   determine a training segment within the region that most closely approximates one of an elevation gain or an elevation loss corresponding to the elevation input.

8. The device as recited in claim 1, wherein the route event mapping service is configured to generate an overlay of the athletic event course for display over the training course.

9. A route event mapping system, comprising:
   one or more network devices to implement a route event mapping service that is configured to:
   receive a request from a device for route event mapping of an athletic event course, the request including a location of the device;
   obtain course data of the athletic event course;
   determine a training course based on the course data, the training course determined within a region that includes the location of the device;
   map training segments of the training course that at least approximate segments of the athletic event course, the training segments mapped within the region that includes the location of the device; and
   communicate the mapped training segments to the device for display in a map of the region, the mapped training segments displayed with corresponding segments of the athletic event course displayed over the training course.

10. The route event mapping system as recited in claim 9, wherein the route event mapping service is configured to receive positioning system data that indicates the location of the device.

11. A method, comprising:
    executing a route event mapping service with a processing system to perform:
    obtaining course data of an athletic event course;
    determining training segments of a training course based on the course data;
    mapping the training segments of the training course that at least approximate segments of the athletic event course, two or more of the training segments that correlate to respective segments of the athletic event course being mapped non-consecutively; and
    displaying the two or more training segments non-consecutively in an overlay of the training course over a representation of the athletic event course.

12. The method as recited in claim 11, wherein the course data of the athletic event course comprises at least one of a course route, a course length, and elevation data.

13. The method as recited in claim 11, further comprising:
    receiving a request from a device for route event mapping of the athletic event course, the request including a location of the device;

said determining the training course and mapping the training segments within a region that includes the location of the device; and communicating the mapped training segments to the device for display in a map of the region.

14. The method as recited in claim 11, wherein all of the segments of the athletic event course are mapped to corresponding training segments, and wherein the corresponding training segments that correlate to the respective segments of the athletic event course are mapped non-consecutively in the overlay of the training course.

15. The method as recited in claim 11, further comprising:
receiving an input of the athletic event course as a user input to a device;
displaying a map of a region that includes a location of the device; and
mapping the training segments within the region that includes the location of the device responsive to said determining the training course.

16. The method as recited in claim 15, further comprising:
receiving a distance limit as a user input; and
determining a training segment of the training course that begins within the distance limit from the location of the device, the training segment extending beyond the distance limit.

17. The method as recited in claim 15, further comprising:
receiving a segment designation of a segment of the athletic event course as a user input; and
determining a training segment within the region that most closely approximates the segment of the athletic event course.

18. The method as recited in claim 15, further comprising:
receiving an elevation input as a user input; and
determining a training segment within the region that most closely approximates one of an elevation gain or an elevation loss corresponding to the elevation input.

19. The method as recited in claim 11, further comprising:
determining a training segment that most closely approximates a respective segment of the athletic event course starting from a current location of the device.

20. The method as recited in claim 19, wherein said providing the direction comprises at least one of:
mapping the training segment for display on a map that includes the location of the device;
generating audio instructions to direct a user of the device along the training segment; and
generating displayable route instructions in a text-based format to direct the user of the device along the training segment.

* * * * *